(12) United States Patent
Farrell et al.

(10) Patent No.: US 12,375,288 B2
(45) Date of Patent: Jul. 29, 2025

(54) SECURING IN-VEHICLE SERVICE ORIENTED ARCHITECTURE WITH MAC GENERATE ALLOW LIST ENFORCEMENT IN HOST DEVICE

(71) Applicant: GM GLOBAL TECHNOLOGY OPERATIONS LLC, Detroit, MI (US)

(72) Inventors: Brian Farrell, Troy, MI (US); Sherif Aly, West Bloomfield, MI (US); Manohar Reddy Nanjundappa, Cedar Park, TX (US)

(73) Assignee: GM Global Technology Operations LLC, Detroit, MI (US)

( * ) Notice: Subject to any disclaimer, the term of this patent is extended or adjusted under 35 U.S.C. 154(b) by 213 days.

(21) Appl. No.: 18/459,603

(22) Filed: Sep. 1, 2023

(65) Prior Publication Data
US 2025/0080358 A1   Mar. 6, 2025

(51) Int. Cl.
*H04L 9/32* (2006.01)
*H04L 9/08* (2006.01)

(52) U.S. Cl.
CPC .......... *H04L 9/3242* (2013.01); *H04L 9/0866* (2013.01); *H04L 9/3234* (2013.01)

(58) Field of Classification Search
CPC ... H04L 2209/84; H04L 63/083; H04L 63/20; H04L 9/0643; H04L 9/0866; H04L 9/3234; H04L 9/3242; B60R 16/023
See application file for complete search history.

(56) References Cited

U.S. PATENT DOCUMENTS

| | | | | |
|---|---|---|---|---|
| 10,009,325 | B1 * | 6/2018 | David | H04L 9/16 |
| 10,104,094 | B2 * | 10/2018 | Ichihara | H04W 12/121 |
| 10,211,990 | B2 * | 2/2019 | Nairn | G06F 21/64 |
| 10,963,543 | B2 * | 3/2021 | Takumi | G06F 21/6209 |
| 11,936,689 | B2 * | 3/2024 | Risso | H04L 63/164 |
| 12,088,728 | B2 * | 9/2024 | Kalaiselvam | H04L 9/0894 |
| 12,169,560 | B2 * | 12/2024 | Duplys | G06F 21/554 |
| 2019/0116045 | A1 * | 4/2019 | Markham | H04L 63/0876 |

(Continued)

FOREIGN PATENT DOCUMENTS

| | | |
|---|---|---|
| DE | 102017219661 A1 | 5/2019 |
| DE | 102021117500 A1 | 1/2023 |

OTHER PUBLICATIONS

Li Ruikun et al., An Efficient Access Control Framework For Service-Oriented Architecture of Vehicle, in 18th International Computer Conference on Wavelet Active Media Technology and Information Processing pp. 404-412 (2021) (Year: 2021).*

(Continued)

*Primary Examiner* — Sharon S Lynch
(74) *Attorney, Agent, or Firm* — Quinn IP Law

(57) ABSTRACT

An electronic control unit (ECU), or node, is configured to use a single key for generating requests from a security peripheral for a MAC. The security peripheral includes the stored shared key. The security peripheral may further include a policy enabling it to detect if a request from the V-ECU is valid, in which case it generates a MAC. The security peripheral is also used to store information in a MAC Generate Allow List (MGAL). In some embodiments, the receiving nodes in a network receive data based on a security peripheral's response to a transmit nodes requests for a MAC. The receiving nodes use this knowledge to avoid being spoofed.

20 Claims, 6 Drawing Sheets

(56) References Cited

U.S. PATENT DOCUMENTS

| | | | |
|---|---|---|---|
| 2019/0347087 A1* | 11/2019 | Farah | G06F 8/65 |
| 2022/0201039 A1* | 6/2022 | Risso | H04L 63/0823 |
| 2023/0070247 A1* | 3/2023 | Duplys | G06F 21/85 |
| 2025/0071036 A1* | 2/2025 | Kurachi | H04L 12/28 |

OTHER PUBLICATIONS

Specification of Crypto Driver AUTOSAR CP R22-11, AUTOSAR, Nov. 24, 2022, Seiten 1-125, Document ID 807: AUTOSAR_SWS_CryptoDriver dated Nov. 24, 2022.

* cited by examiner

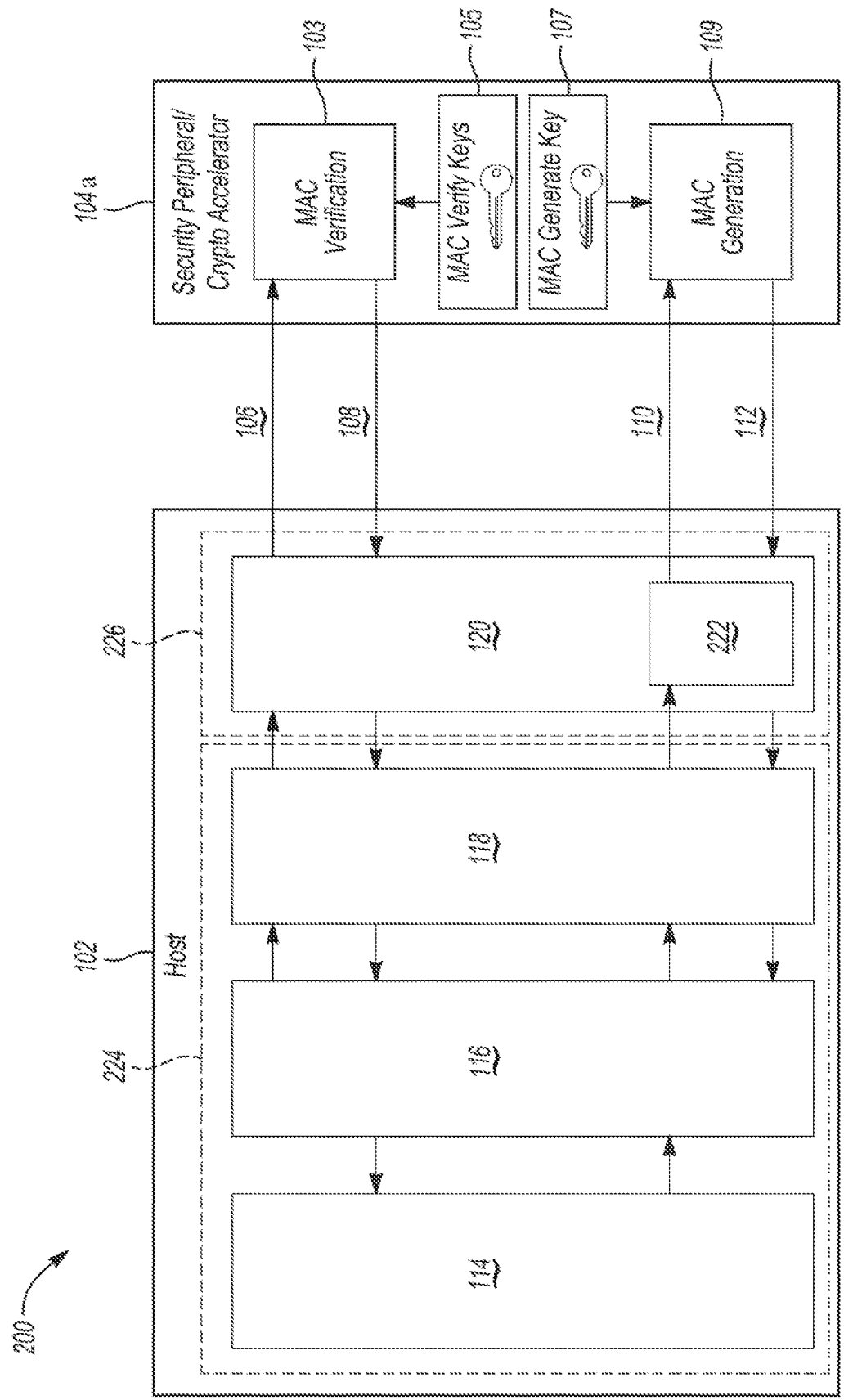

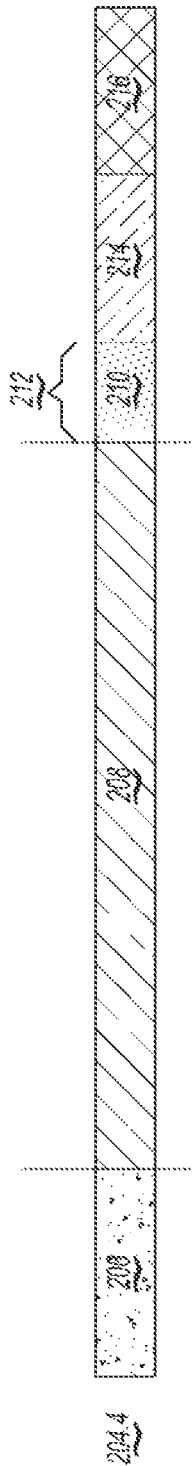
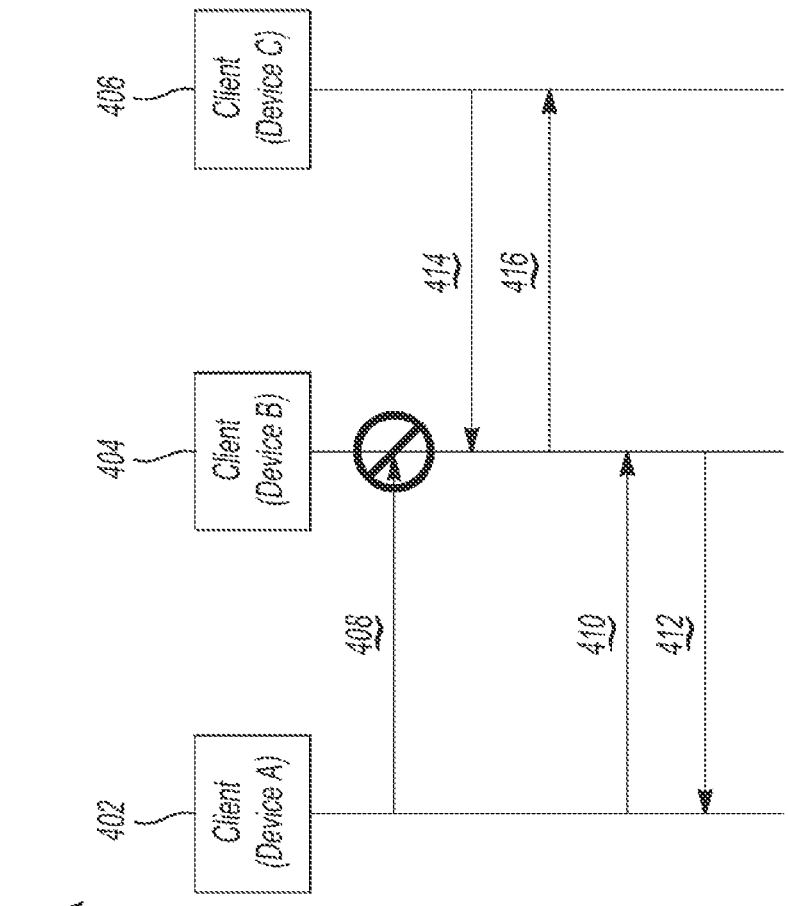

SECURING IN-VEHICLE SERVICE ORIENTED ARCHITECTURE WITH MAC GENERATE ALLOW LIST ENFORCEMENT IN HOST DEVICE

INTRODUCTION

Modern vehicles have seen technological advancements in the amount of electronics and software relevant to both performance and luxury criteria. Electronic Control Units (ECUs), for example, are used in greater numbers as embedded systems within the vehicle that control different electromechanical systems. Modern vehicles include different ECUs for controlling a host of different vehicle systems from engine control to entertainment devices.

Vehicle Service-Oriented Architecture ("SOA") has enhanced the progression of ECU technology in vehicles by reframing much of the copious code in the 100+ ECUs in modern vehicles to more defined middleware. SOA incorporates certain components to act as middleware between applications or services on one hand, and the vehicle operating system on the other hand. Middleware helps uncouple the various software components from the vehicle hardware, resulting in greater software portability and a simpler development process. Like in computer fields, SOA hides more abstract layers and makes it easier for multiple third-party devices to port software applications to different portions of the ECU network.

Vehicle SOA has significant security concerns. Former vehicle implementations were hardwired or at least configured such that high priority messages were carried over dedicated, known data lines between ECUs. By contrast, SOAs offer different possible implementations and rely on a service discovery period for the various processing circuits to learn from which sources security-critical messages come. This architectural flexibility can lead to spoofing and other malicious attacks where foreign devices plugged into the vehicle network send fake security-critical messages to a target device in the vehicle to apply the vehicle brakes, change the vehicle speed, or perform other unauthorized and potentially hazardous actions.

Unless properly addressed, an "in-vehicle network" can translate to more third-party malicious code attempting to spoof other legitimate nodes resulting in the vehicle taking actions with unintended consequences.

SUMMARY

A system for authorizing messages in a service-oriented includes a security peripheral device, and a host device coupled to the security peripheral device and including a processor configured to execute code in a local memory thereto to produce a crypto interface driver, the crypto interface driver configured to determine whether the host device is authorized to send a security-critical first message from the host device to a receiving device by maintaining a message authentication code (MAC) generate allow list (MGAL) enforcement module at the host device, the MGAL enforcement module for enabling the host device to provide to a MAC generation module executing on the security peripheral device a MAC generate message including a first identifier (ID), wherein when the first message is authorized, the MAC generation module of the security peripheral device is configured to retrieve a corresponding first key based on the first ID, to generate a first MAC based on the corresponding first key, and to send to the crypto interface driver of the host device the first MAC, and the host device is configured to send the first message together with the first MAC to the receiving device.

In various embodiments, when the first message is not authorized, the MAC generation module of the security peripheral device is unable to identify a key and refrains from generating a MAC. When the host device receives a security-critical second message along with a second ID and a second MAC from a sending device, the crypto interface driver may be configured to determine whether the sending device is authorized to send the second message to the host device by enabling the host device to send to a MAC verification module executing within the security peripheral device the second ID and the second MAC together with a key serial number (KSN) for identifying the key to be retrieved, wherein when the MAC verification module uses the KSN to retrieve a corresponding second key in the security peripheral device, the security peripheral determines that the second message is authorized; and when the MAC verification module cannot identify a corresponding second key using the KSN, the security peripheral device determines that the second message is not authorized.

In various embodiments, the MGAL enforcement module includes an authentication policy to determine if a message is allowed to be transmitted. The first ID may include a secure onboard communication data identifier (SecOC-DataID). The processor may be configured such that the crypto interface driver has exclusive access to the security peripheral device for messages to be sent from the host device or received from a sending device. The processor may be further configured to execute code to include a crypto service manager module operatively coupled to the crypto interface driver for passing security-critical message types requiring MAC verification or MAC generation via the crypto interface driver to and from the security peripheral device, a communication stack module operatively coupled to the crypto service manager module for passing non-security-critical message types to and from other vehicle devices and for passing the security-critical message types via the crypto interface driver to and from the security peripheral device, and an application software module operatively coupled to the communication stack module for performing respective functions based on the non-security-critical and security-critical message types passed from the communication stack module, wherein only the crypto interface driver is capable of interfacing with the security peripheral device.

In various embodiments, the processor includes a plurality of processor cores, at least one processor core of the plurality is configured to execute code to include the one or more software applications, the communication stack module, and the crypto service manager module; and another processor core of the plurality includes the security peripheral device. The first identifier (ID) along with the first message transmitted from the host device to the security device further includes a key serial number, the key serial number configured to identify a type of service associated with the message and determined during an earlier service discovery period. The host device and the security peripheral device are portions of the same integrated circuit.

In various embodiments, the host device acts at least in part as a server; the server is configured to authorize a first client device to set or change a target value, authorize a second client device to read the target value, and restrict the second client device from setting or changing the target value.

In another aspect of the disclosure, a system for authorizing messages in a service-oriented vehicle architecture includes a plurality of nodes, each node including a security peripheral device; and a host device coupled to the security peripheral device and including a processor configured to execute code in a local memory thereto to produce a crypto interface driver, the crypto interface driver configured to determine whether the host device is authorized to send a security-critical first message from the host device to one of the receiving nodes by maintaining a message authentication code (MAC) generate allow list (MGAL) enforcement module at the host device, the MGAL enforcement module for enabling the host device to provide to a MAC generation module executing on the security peripheral device a MAC generate message including a first identifier (ID), wherein when the first message is authorized, the MAC generation module of the security peripheral device is configured to retrieve a corresponding first key based on the first ID, to generate a first MAC based on the corresponding first key, and to send to the crypto interface driver of the host device the first MAC, and the host device is configured to send the first message together with the first MAC to the one of the receiving nodes.

In various embodiments, when the first message is not authorized, the MAC generation module of the security peripheral device is unable to identify a key and refrains from generating a MAC. Further, when the host device receives a security-critical second message along with a second ID and a second MAC from a sending device within the plurality of nodes, the crypto interface driver is configured to determine whether the sending device is authorized to send the second message to the host device by enabling the host device to send to a MAC verification module executing within the security peripheral device the second ID and the second MAC together with a key serial number (KSN) for identifying the key to be retrieved, wherein when the MAC verification module uses the KSN to retrieve a corresponding second key in the security peripheral device, the security peripheral determines that the second message is authorized, and when the MAC verification module cannot identify a corresponding second key using the KSN, the security peripheral device determines that the second message is not authorized.

In various embodiments the MGAL enforcement module includes an authentication policy to determine if a message is allowed to be transmitted. The first ID may include a secure onboard communication data identifier (SecOC-DataID). A host device may include an Android virtual machine running on a hypervisor. The host device may download an Android Package. A private key authorizes that a manifest of the Android Package be populated with fields and signs the manifest, and a public key corresponding to the private key verifies the signature.

In various embodiments, the MGAL enforcement module may initiate an uninstall of a version of a Dynamic MGAL, the MGAL deletes service information, if any, corresponding to the uninstalled version if the uninstalled version is the only application having the service information; and the MGAL preserves the service information, if any, corresponding to the uninstalled version if the uninstalled version is not the only application having the service information. The host device includes a plurality of virtual machines running across a hypervisor. The host device includes a security module for generating a verification key and a separate security module for generating a generation key, the generation key for creating the MAC consistent with the MGAL policy.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes the various combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, explain the principles of the disclosure.

FIG. 2 is a conceptual diagram of an example ECU including a host device having two processor cores, wherein the first processor core is configured to execute the application software module, the communication stack module, and the crypto service manager module, and wherein the second processor core is configured to execute the crypto interface driver.

FIG. 3 is an example timing diagram of a data packet in accordance with an embodiment.

FIG. 4 is a timing diagram illustrating the distinction between the "get" and "set" permissions accorded nodes in a vehicle, according to an embodiment.

Figure 1:
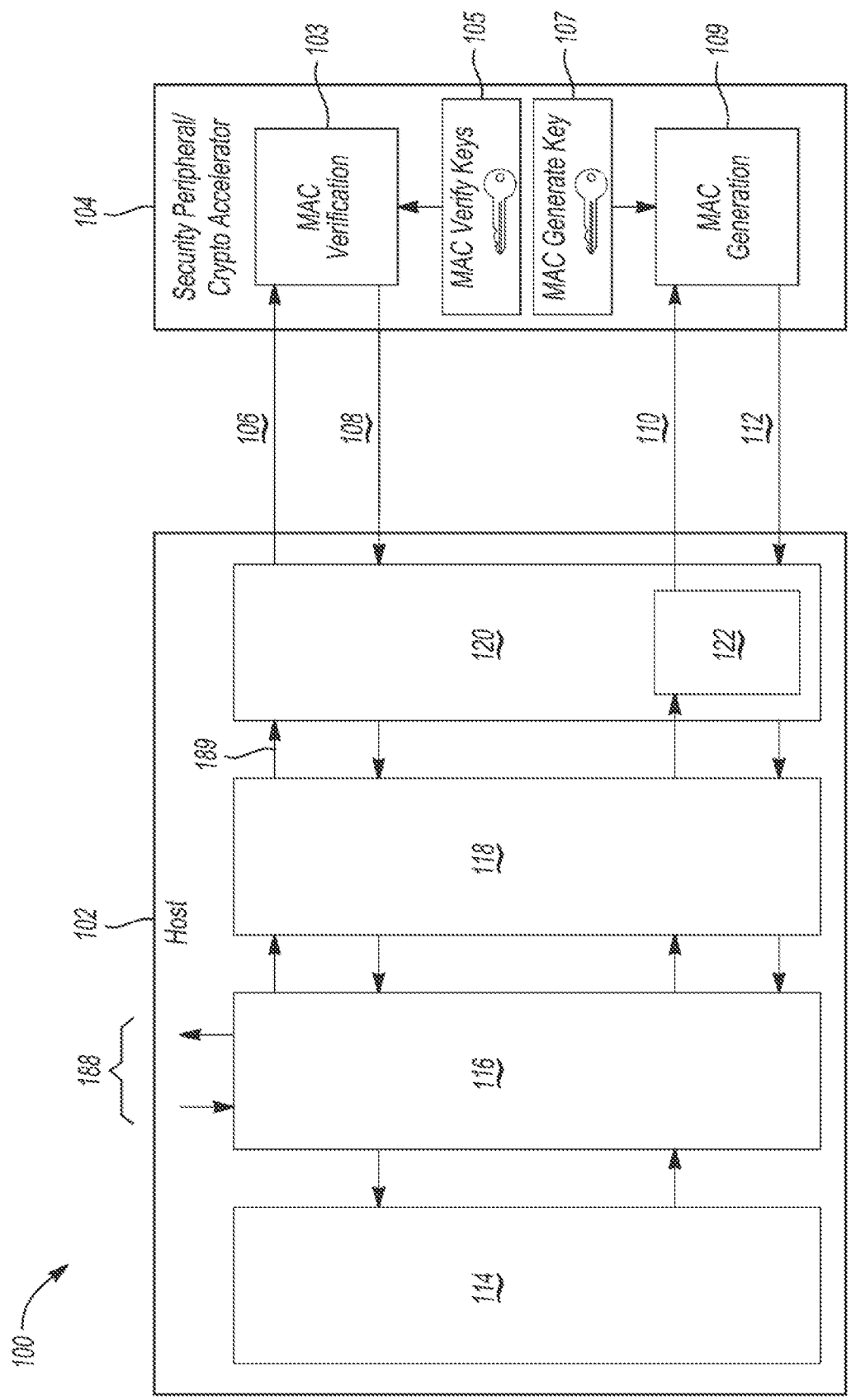
FIG. 1 is a conceptual diagram of an example Electronic Control Unit (ECU) including a host device and a security peripheral device implemented using a service-oriented architecture (SOA) of a vehicle, in accordance with various embodiments.

The appended drawings are not necessarily to scale and may present a simplified representation of various features of the present disclosure as disclosed herein, including, for example, specific dimensions, orientations, locations, shapes and scale. Details associated with such features will be determined in part by the particular intended application and use environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including," "containing." "comprising." "having." and the like shall mean "including without limitation." For example, "optimal vehicle routes" may include one or more optimal vehicle routes. Moreover, words of approximation such as "about," "almost." "substantially," "generally," "approximately," etc., may be used herein in the sense of "at, near, or nearly at," or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

The principles of the present disclosure are directed to vehicle networks and nodes, and their particular susceptibility to spoofing and other malicious software attacks when the vehicle is implemented in an SOA-based network environment using a plurality of host devices for performing different functions. According to certain aspects, this vulnerability may be addressed, and the problem solved, by using a security peripheral/crypto accelerator device (referred to for convenience hereafter as "security peripheral device") to verify the integrity of security-critical messages and to generate for each of the transmitting nodes a message authentication code (MAC) over the message to be sent. For purposes of this disclosure, security-critical messages may include any message sent from a sending device to a receiving device that performs functions that need a security verification, including but not limited to message types involving performing physical acts or functions like braking, acceleration, setting different values that other devices may rely on, and performing standard security-based functions that are needed to avoid damage to the vehicle or harm to the occupants within.

Physically, the host device is a hardware component or portion thereof that may be implemented using a processor and other components in an ECU in the vehicle, for example. The security peripheral is also a hardware component or portion thereof and may be physically implemented in any number of ways. For example, the security peripheral may reside on a different section of the same integrated circuit device on which the host device resides. In other embodiments, the security peripheral device may be implemented on a separate integrated circuit and physically coupled to the host device. In still other embodiments, the host device and security peripheral may be embedded in different housings and coupled together via wiring.

FIG. 1 is a conceptual diagram of an example ECU 100 including host device 102 and a security peripheral device 104 implemented using a service-oriented architecture (SOA) in a vehicle, according to various embodiments. The ECU 100 includes a host device 102. The host device may include one or more processors, microcontrollers and memory (see FIG. 4). The host device 102 is connected to a security peripheral device 104. In various embodiments, the security peripheral device 104 includes a crypto accelerator, discussed further below. The ECU may occasionally be referred to as a node. For purposes of this disclosure, a node may be an ECU or any processor in the device that includes the security measures that reside below. In one aspect of the disclosure, a security peripheral device 104 (or potentially another higher privileged module or core with exclusive access to the security peripheral device 104 (which may also include a crypto accelerator)) within a transmitting node in a vehicle or other transport mechanism (e.g., an ECU 100 or other processor or node) to do internal policing using a policy present in the MGAL enforcement module 122 that ensures that the secret keys within the ECU 100 cannot be used to generate a MAC over messages that the ECU 1000/node is not otherwise permitted to send. A more detailed description of this innovation is presented below with reference to FIG. 1.

An ECU is a device in a vehicle that controls one or more vehicle electrical systems. The ECU instructs the vehicle how to operate. In most cases, the core of an ECU is one or more processors that execute instructions of embedded software. A virtual-ECU (V-ECU) is a software model of target ECU hardware that may assist in performing ECU functions and simulations, but that may be implemented purely in software, such as on the microprocessor of an ECU. V-ECUS advantageously enable vehicle functions to be tested using microcontrollers in laboratories before the functions are deployed in the vehicles to be sold, for example. Each instance of the V-ECU may be simply deployed with the test solution, after which the functionality may be thoroughly tested. For sophisticated ECUs, V-ECUs may be used as independent entities within the system to perform authorized tasks.

As a short introduction to the operation of the circuits in FIG. 1, the MAC generation module 109 is used in conjunction with the MAC Generate Allow List (MGAL) enforcement module 122 when an application in the application software module 114 at the host device 102 generates a security-critical message and sends (via the communication stack module 116, the crypto service manager module 118, and the crypto interface driver 120 within the host device 102) a request to generate a MAC for use over a secure (security-critical) message that the host device 102 wants to send to a target ECU (node) or a virtual-ECU (within a node). (If the message is non-security-critical, the communication stack module 116 sends the non-security-critical message back to the application software module 114 for execution by an application, or if the request is intended for another node, the communication stack module 116 instead sends the non-security-critical message over a network (conceptually indicated by one of the arrows 188) for execution by the intended receiving node or ECU. If the request is a security-critical request intended for another node, the request will need a MAC. A non-exhaustive explanation of how an authorized, security-critical message obtains a MAC is set forth below. In addition, the excerpts below further describe how and when security-critical messages are deemed not authorized and rejected accordingly.

The configuration in FIG. 1 is a hardware/software-based ECU solution that, when active, tends to reduce the cost of the overall network nodes without losing its capabilities. The host device 102 may initiate the process by sending a MAC-generation request (received at the communication stack module 116, as discussed further below) over hardware connection 110 to MAC generation module 109 of the separate security peripheral device 104a. The information sent over the hardware connection 110 from the host device 102 to the MAC generation module 109 is conditional, however, on whether the message satisfies the relevant policies of the MGAL enforcement module 122 of the crypto interface driver 120 in the host device, as explained further below. If the MGAL enforcement module 122 authorizes the passage of the security-critical message to obtain a MAC (which in turn will authorize it to be performed at a receiving node), a MAC generate message is first sent over hardware connection 110 to the MAC generation module 109. The MAC generate message may also include criteria like the message identifier (which in this configuration is known as SecOCDataID), the KeySlotNum ("key slot identifier"), and other security-related information elements). The host device 102 may also in some embodiments include the MAC data, which may include the type of service, type of data transmitted, etc. In still another embodiment, the MAC generation module 109 may use hardware to review the relevant contents of the MGAL enforcement module 122 and determine based on the MAC ID whether a MAC for the host device 102 may be generated based on the host's prior history and related factors. For example, the MAC generation module 109 may further check the historical records of the MGAL enforcement module 122 (in embodiments where they are available), which lists the MAC IDs. In other configurations, the MGAL promulgates one or more policies about which nodes/ECUs were previously permitted to send which messages to what modules related to what subject matter. In the former embodiment, if the MAC ID is not listed in the MGAL, the MAC generation module 109 will be unable to generate the MAC and will return an error. If the MGAL's information shows that that the message is authentic and the host device 102 is above board, the MAC generation box may retrieve a key from MAC generate key module 107, may generate a MAC, and may send it back to the host via hardware connection 112. As noted, the receiving nodes may be made aware of the generation of the MAC (or lack thereof) for this device. Using this and similar background information, the receiving nodes may eventually learn which devices may and may not be trusted, relative to which MAC IDs or in general.

The MAC verification module 103 may instead be used when the host device 102 has received a message from a distinct node in the network, such that the distinct node wants the host device 102 to execute the function in the message. To verify the authenticity of the MAC, the host device 102 may take the received MAC and send a MAC verify message and factors similar or identical to the factors listed above with reference to hardware connection 110, to the MAC verification module over hardware connection 106. If the MAC verification module 103 determines that the MAC represents a spoof, it does not return a MAC, and the host device 102 may reject the request. Otherwise, if the MAC verification module 103 finds or retrieves a key from the MAC verify keys module 105 matching a key serial number in the provided MAC verify message, the MAC verify keys module 105 may use the retrieved key serial number to generate or find the corresponding MAC and to send the retrieved MAC back to the host device 102 over hardware connection 108.

Figure 7:
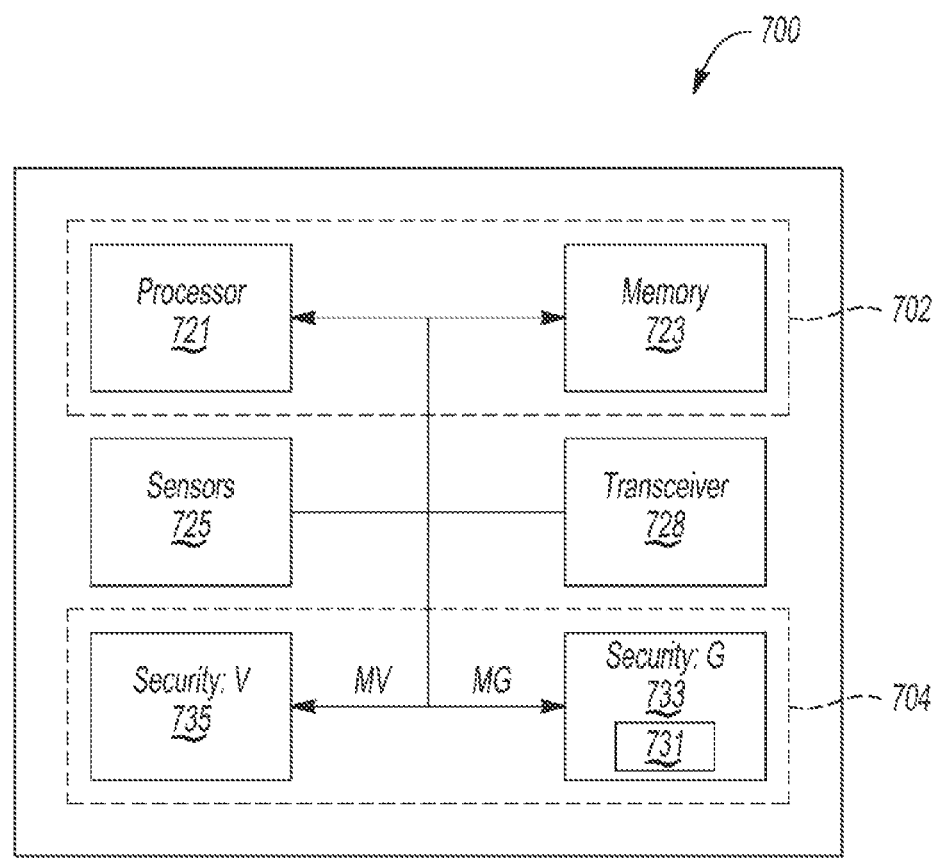
FIG. 7 is a hardware representation of an aspect of the present disclosure.

While the host device 102 and the security peripheral device 104 may be encapsulated in an ECU 100 or similar module, this configuration is not needed, and in some embodiments an ECU is not used. Further, for purposes of this disclosure, the term "processor" may constitute more than one processor. The term processor may refer to any kind of controller or microcontroller for executing various tasks. In some cases, at least part of the processor may be dedicated hardware, such as in a digital signal processor (DSP). The processor may also be available as, or implemented in (in part or full), an application specific integrated circuit (ASIC), a System on a Chip (SoC), combinational Boolean logic circuits that perform the requisite digital functions, etc. The transistors used in the processor may include Complementary metal-oxide-semiconductor (CMOS) technology, bipolar transistors, Gallium-Arsenide transistors, and a combination of the same. The processor may execute middleware, and in some embodiments, it may rely at least partially on one or more application programming interfaces to communicate with other systems. The processor may also include upgradeable firmware as discussed herein. In addition, the hardware portion of the host device 102 may also include local memory 723 (FIG. 7). Local memory 723 (FIG. 7) may be coupled to the processor 721 used to store data and code, including executable code that enables the processor to produce the various functional modules depicted in FIG. 1. The memory 723 may be any form of volatile and/or non-volatile memory, including but not limited to, dynamic random access memory (DRAM), static random access, and the like. The host device 102 may also include other forms of memory 723, including any non-volatile computer accessible storage or solid state drives for longer term storage of data, as well as NAND and NOR based flash memory, which is also typically non-volatile in nature. The memory 423 may be customized to form any database or repository, or combination thereof, for use in the EPC.

Referring back to FIG. 1, the host device 102 includes at least one processor and memory local to the processor for executing code that performs various functions, described in FIG. 1 as the application software module 114, the communication stack module 116, the crypto service manager module 118, and the crypto interface driver 120. Each of the modules 114, 116, 118, and 120 within the host device 102 are separated by bi-directional arrows. These arrows represent the conceptual flow of information with, and interaction between, the various modules (sometimes referred to as layers) as they are each run as one or more threads of execution on the core(s) of the one or more processors.

The application software module 114 of FIG. 1 enables the host device 102 to be populated with one or more low level applications. For example, where the ECU 100 is dedicated to performing a specific function like reading and providing engine temperature data to other ECUs, the application software module 114 may be configured to perform this function and provide output data to the communication stack module 116 via the lower horizontal arrow. The application software module 114 may also obtain data from other ECUs via the communication stack module 116 using the upper horizontal arrow. The communication stack module 116 may in some implementations function like a network layer, wherein data passes to and from the host device 102 over a physical network such as Ethernet (or any of a variety of different network implementations). Data received at the communications stack module 116 and intended for one of the local applications running in application software module 114 may be passed to module 114 as illustrated by the conceptual input arrow 188. Similarly, where the application software is configured to output data from the host device 102, the application in question may pass the device to the communication stack module 116, where the data is then passed to the conceptual output arrow 188. The arrows 188 collectively represent a pathway to transfer data to and from other ECUs at the communication stack module 116.

Referring back to application software module 114, it will be appreciated that the module lacks direct access to the security peripheral device 104. Thus, the application software module 114 is free to run low-privileged, non-critical functions and pass the results to the communication stack module 116 for transmission to other locations in the vehicle. Non-security-critical functions are generally those functions that do not have a deleterious effect on the control of the vehicle and do not pass misinformation to the driver that may result in an external force event, breakdown, or other problem. This stands in contrast to security-critical messages, which may include messages instructing the vehicle to accelerate, brake, or perform some other potentially critical function. As noted, in the SOA configuration, different plug-ins, custom ECUs, and other processing or control devices may be dynamically added to or removed from the vehicle or other transport mechanism during the course of its lifetime. Unlike the existing static, hardwired vehicle configurations where dedicated messages pass through dedicated wires, thereby creating little doubt where the message came from, the more flexible SOA requires that security-critical messages or data from a sending ECU (or sending node) be accompanied by a verifiable message authentication code (MAC) so that the receiving node may use its own security enforcement hardware and software to verify that the message is authorized before the receiving node acts on it. Were this not the case, in an SOA, a malicious user may (for example) attach a plug-in device to the vehicle's infotainment system. The plug-in system may, in turn, transmit an unauthorized security-critical message to a receiving node responsible for applying the vehicle's brakes. Absent the MAC authorization requirements, the plug-in module may effectively spoof the receiving node randomly applying the brakes, which may result in a hazardous impact event.

In contrast to the non-security-critical messages, the security-critical messages need to be accompanied by the appropriate MAC, which may be generated by private keys in a repository within the security peripheral device and verified for its authenticity. Aspects of these measures, where the applications software layer 114 is executing a security-critical task to send to another ECU or is receiving a security-critical messages, are discussed further below.

The host device 102 further includes a crypto service manager module 118. The crypto service manager module 118 is a software module generated by executable code of the processor. The crypto service manager module 118 is operatively coupled with the communication stack module 116 as well as the crypto interface driver 120 via the two sets of four horizontal, bidirectional lines connected to the crypto service manager module 118. These bidirectional lines are illustrated to reflect that the crypto service manager module 118 is capable of sending and receiving messages to and from the communication stack module 116 and the crypto interface driver 120. The significance of this operative coupling is also discussed further below.

Like modules 114 and 116, the crypto service manager module 118 is configured (in and of itself) to send and receive non-security-critical messages. Similarly, like modules 114 and 116, the crypto service manager module 118 has no access to the security peripheral device 104. In an embodiment, the crypto service manager module 118 may receive messages from communication stack module 116 and may forward those messages to the crypto interface driver 120. In addition, the crypto service manager module 118 may receive messages from crypto interface driver 120 and pass the messages via the appropriate horizontal operative connection to the communication stack module 116. Depending on the destination of the message, the message may be sent to another receiving node in the vehicle using the communication stack and conceptual arrows 188. Alternatively, or additionally, the message from the crypto service manager module 118 may be sent to the communication stack module 116, where it is forwarded to the application software module 114 for use by an application or function residing thereon.

Because this aspect of the disclosure prevents lower-level modules in an architecture from accessing high security features, processors in a vehicle that implement these principles cannot easily be spoofed or otherwise maliciously compromised. Security-critical messages need to be transmitted along with a MAC to authorize the function in the message to be performed. Accordingly, if the communication stack module 116 receives a security-critical message from a sending node in another part of the vehicle, module 118 cannot simply forward the message to the application software module 114 for execution because, absent the correct permissions, the application software module 114 is configured to execute just non-security-critical functions of the vehicle. Conversely, and for the same reason, an application in module 114 cannot generate a security-critical message and pass it to the communication stack module 116 via one of arrows 188 along to the transmitting hardware of the ECU 100 to a receiving node, because the security-critical message lacks a MAC. A receiving node will recognize the absence of a MAC (or a wrong MAC, in some examples), and will simply discard or ignore the message. Thus, even in an SOA, the absence of correct MACs will prevent security-critical messages from being authorized for execution, and the integrity of the SOA vehicle system remains preserved.

Referring still to FIG. 1, the host device 102 may, as noted, also include a crypto interface driver 120. One purpose of the crypto interface driver 120 is for authorizing security-critical messages for execution on the EPC 100 or another node. More specifically, the crypto interface driver 120 is a software module operatively coupled to the communication stack module 116 and coupled via hardware connections 110, 112 to a separate security peripheral device 104a (the latter of which may include a crypto accelerator as described herein). Also, while the crypto interface driver 120 is a software module or data structure implemented on the host device 102, the security peripheral device 104 is a hardware component that may reside on the same integrated circuit as the host device, or that may reside on a common printed circuit board (PCB) as the host device 102 with the host device 102 and the security peripheral device 104 connected together using hardware, or that may reside as a separate physical component that is connected to the host device.

According to aspects of the disclosure, the host device 102 may implement non-security-critical messages quickly and efficiently, often without the need for further authorization. However, in the absence of the exemplary procedures outlined below, the host device 102 lacks the authority to execute security-critical messages, thereby preserving the security of the SOA vehicular network.

In host device 102, the crypto interface driver 120 includes a MAC Generate Allow List (MGAL) enforcement module 122. The MGAL may be a policy or suite of policies implemented in software or as a data structure in a data repository within the host device 102 and accessible to the crypto interface device 120. In various embodiments, the purpose of the crypto interface driver 120 is twofold. First, for security-critical messages from a sending device (e.g., another ECU positioned in the vehicle, etc.), the crypto interface driver 120 may use hardware connections 106 and 108 to interface directly with the security peripheral device 104 to determine whether the sending device is authorized to send the security-critical message such that, for example, the message may be passed to a local application within the application software module 114 on the host device 102 to perform the function described in the message if an appended MAC accompanies the message and the MAC is legitimate. In this instance, the security-critical message may be considered valid when it is sent along with a verified MAC (e.g., in or with a message payload) that is recognized by the security peripheral device 104 and that authorizes the host device 102 to execute the instructions in the message to perform the intended function. In some embodiments, the message may also include other pertinent information (e.g., a key serial number and a message identifier) that may be used by the security peripheral device 104.

Second, for a security-critical message generated by an application on the application software module 114 of the host device 102 (in this example, the sending device), the crypto interface driver 120 may be configured to use the MGAL enforcement module 122 together with the hardware connections 110 and 112 to and from the security peripheral device 104 to determine whether the host device 102 is authorized to send the security-critical message from the host device 102 to a receiving device (e.g., another processor, ECU, or other component performing functions). If the host device 102 is authorized, then the security-critical message along with the generated MAC and potentially other information may be sent to the communication stack module 116 and out to the receiving device. The receiving device, upon verifying the integrity of the appended MAC, may then proceed to perform the security-critical function.

Thus, in order to perform security-critical functions or to generate a security-critical message to be sent for performance of potentially critical functions on a receiving device, the application software module ultimately has to receive the authorization from the security peripheral device by first going through the crypto interface driver, where the policies of the corresponding MGAL are determined to identify whether or not the security-critical message is authorized. If not authorized, the message is ignored or discarded. If the host device 102 is receiving a message from a sending device with a MAC, then the MGAL enforcement module 122 is not involved. Instead, the existing MAC is verified as authentic or not. Examples of these two criteria are described in greater detail below.

Generating a Security-Critical Message on Host Device for Performing a Priority Function on Another Device With continued reference to FIG. 1, a non-exhaustive embodiment of the above procedure is shown. Beginning at the application software module 114, an application or database therein may generate a message. The subject application may also generate other information relevant to the message, such as a message identifier (ID) and origin, for example. The message is then transmitted to the communication stack module 116. If the message is a non-security-critical one for execution on a receiving device (e.g., an instruction to read a value), the communication stack module 116 just sends the message to the receiving module (shown by conceptual out arrow 188) through the physical network in place. In other cases, the message may be a security-critical message, such as a braking command ultimately intended for execution by an ECU associated with a braking device (the "receiving device"). The braking message may or may not constitute a malicious spoofing attempt. Regardless, the communication stack module 116 in this embodiment, upon checking the relevant fields in the message, determines that the message is a security-critical one, which needs a valid MAC appended thereto if it is to be sent to the designated receiving device and executed. (If the message were simply sent by the communication stack module 116 via one of arrows 188 over a physical network to a destination recipient device without a valid MAC, the message would be ignored or an error message would be generated if the message is deemed security-critical.)

Accordingly, when the application sends the generated message to the communication stack module 116, the communication stack module 116 instead sends the security-critical message to the crypto service manager module 118 of the host device 102. The crypto service manager module 118, in turn, may forward the message to the crypto interface driver 120. This information may signify to the crypto service manager module 118 that the device is sourced from the host device 102 but must be verified as authentic and authorized before it is transmitted to the target receiving device. That is to say, a MAC should be generated and appended to the message to validate the security-critical message as authorized.

In these embodiments, the crypto interface driver 120 is a high-privileged module for processing security-critical messages. This is in contrast to the other modules 114, 116, and 120 in the host device 102. Since the latter modules constitute low-privileged modules strictly for non-security-critical messages, if malicious code or spoofing attempts to compromise the low-privileged modules, the corresponding messages would be sent through the crypto-interface driver before they may be executed or acted upon. Because the crypto interface driver 120 is a high-privileged module that is solely responsible for security enforcement, the corresponding security-critical but spoofed messages are rejected based on the enforcement policies of MGAL enforcement module 122 in crypto interface driver 120. In short, because the three modules 114, 116 and 118 in these embodiments are low privileged modules, they cannot access the security peripheral device 104 without authorization from the crypto interface driver 120. This fact ensures that, even in an SOA, no non-security-critical module may execute a security-critical function without first receiving authorization from the security peripheral device 104. Security and message integrity in this manner are retained.

Referring back to the previous example, the security-critical message is passed from the module 118 to the MGAL enforcement module 122 of the crypto interface driver 120. The crypto interface driver 120 may first check an authenticated policy identified in a MGAL 122, which may include a data structure or may refer to a data repository, to determine if the particular message to be sent is authorized to be transmitted by the subject node. The receiving nodes will reject a security-critical message if it lacks a valid MAC. One advantage of executing the MGAL enforcement module at the host is that the processor typically has much higher clock speeds and may execute instructions faster than the security peripheral device 104.

In various embodiments, the crypto interface driver 120 uses a MAC ID or other ID (e.g., secure onboard communication data identifier (SecOCDataID), Key serial number (KSN), etc.) and compares it with policies of the MGAL enforcement module 122 to determine whether a MAC for the subject security-critical message may or should be generated at host device 102. For purposes of this disclosure, unless otherwise stated or clear from the context, the term "Identifier" or "ID" refers to a MAC ID (i.e., an ID that may be used to generate or retrieve a corresponding MAC), or some other identifying indicia that is present that, by itself or with other information, allows the recipient to determine that the security-critical message should be provided a MAC. In some embodiments, the SecOCDataID itself may be used to determine whether the message should be given an appropriate MAC, which in turn may be appended to or along with the Mac generate message prior to sending the message to the security peripheral device 104.

In still other embodiments, the host device 102 may also use the MGAL enforcement module 122 to take into consideration results from previous discovery, the host's prior history, and related factors. For example, in some embodiments, the crypto interface driver 120 may further check the historical records of the MGAL enforcement module 122 (in situations where they are available), which may list the relevant MAC IDs associated with different security-critical messages. In other configurations, the MGAL enforcement module 122 may promulgate one or more policies about which nodes/ECUs were previously permitted to send which messages to what modules and related to what subject matter.

If the MAC ID is not listed in or otherwise identifiable from the MGAL enforcement module 122 (at host device 102) or the corresponding key cannot be found or retrieved from the MAC generate key module (at the security peripheral device 104), the security peripheral device 104 will be unable to generate the MAC and may return an error or simply discard the message. If the MGAL's information shows that that the message is above-board, then as noted, the host device 102 may send a MAC Generate message to the security peripheral device 104. The MAC generation module 109 may use the ID in the message to retrieve a key from MAC generate key module 107, which may be a data repository and may include hardware and/or software. Using the retrieved key, the MAC generation module 109 may generate a MAC, and may send it back to the host device 102 via hardware connection 112. As noted, in some arrangements, the receiving nodes may be made aware of the generation of the MAC (or lack thereof) for this device. In some embodiments, using this and similar background information, the receiving nodes may eventually learn which devices may and may not be trusted, relative to the subject MAC ID or in general.

After the MGAL enforcement module 122 determines that the ID accompanying the security-critical message is legitimate, the MGAL enforcement module 122 may thereafter send the MAC Generate Message over the hardware connection 110 to the security peripheral device 104. In one embodiment, the MAC Generate Message may include a message ID (e.g., SecOCDataID), the data payload of the message (optionally), and a key serial number (KSN) indicating the source of the message).

At the security peripheral device 104, the security-critical message is received at a MAC generation module 109. The MAC generation module 109 may be a hardware or software component, or a combination thereof. The MAC generation module 109 may be coupled to a MAC generate key module 107. In various embodiments, the MAC generate key module 107 may include a list of secret keys that may also be shared by the various devices authorized to encrypt and decrypt the security-critical messages to which they respectively relate. In some embodiments, the MAC generate key module 107 instead includes one or more algorithms for enabling the MAC generation module 109 to retrieve the corresponding key based on the ID in the message.

If the security-critical message is authorized (e.g., not a spoofing attempt), the MAC generation module 109 may use the message ID to identify, generate and retrieve the corresponding key from the MAC generate key module 107. The key may be in a list in the MAC generate key module 107 as noted, or it may be generated based on the ID and potentially other criteria supplied to it from MAC generation module 109. The MAC generation module 109 thereafter uses the key to generate the MAC. The MAC may be generated by the key using software, combinational logic, or other means. The generated MAC may be appended to or otherwise accompany the security-critical message. After the MAC generation module 109 generates the MAC based on the retrieved key, the MAC generation module 109 may transmit the results of the procedure along with the MAC back to the host device 102 over hardware connection 112, as noted. In various embodiments, the results may include the message and other indications that an error has not occurred and that the security-critical message along with the MAC is authorized for sending to the receiving device.

In various embodiments, the MGAL enforcement module 122 will receive the message ID, as above. If the message is authentic, the message ID will be included in the MGAL enforcement module as a message type to which it will add a MAC. That is to say, the MGAL enforcement module 122 uses the message ID as an index into a table of permissions. The permissions in the table will indicate if the host device 102 is authorized to act as a server or client for the message relative to another node (e.g., another host or ECU), and depending on the message type and circumstances of the transaction. When acting as a client, the MGAL will typically specify whether the host 102 has one of two client types. One such client type may act as a client where it can just read data, such as from some target source. Another type is a client that can actually write or set data, as discussed in more detail with respect to FIG. 4.

In these embodiments, the MGAL enforcement module 122 may consider not just the message ID, but also it may consider the message type that indicates what the host 102 is doing in ultimately sending the message. In some embodiments, the message type is based just on the message ID or included within the ID, and can be understood by the MGAL enforcement module 122 upon receiving the ID. In other embodiments, the message type may be gleaned by the MGAL enforcement module 122 based on additional information provided to it.

The message type may specify different actions taken by the requesting device. For example, the message type may specify whether the message type is to publish data, such as making available to other devices the vehicle's speed, for example (or other types of information). To obtain one status versus the other, the permissions table may specify whether the requesting host has the appropriate permissions to perform the function specified by the message. The message type may in other examples be simply to read specified data. Accordingly, in these embodiments, the MGAL enforcement module 122 may include additional criteria specifying what the host 102 or device is trying to do for a particular service. As for the latter example, the SecOCDataID may specify the service ID itself and then also the message type. As noted, an example message type includes publishing (such as where the device is authorized to act as a publishing server for a particular type of data). Another example message type is a request, often performed by a remote procedure call (RPC). As another example, the SecOCDataID also includes a method ID that describes whether the message is trying to set (write) or get (read) data. The MGAL enforcement module 122 may use different permissions depending on the method ID and message type, for example. In some cases, a message ID may also include a bit indicating whether the device or host may act as a client that can set data for the subject message. This bit may be reserved for devices in the vehicle with higher permissions.

Receiving a Security-Critical Message at Host Device for Performing a Priority Function on Host Device In another aspect of the disclosure, the EPC 100 may receive a message at the host device 102 from a sending node, which may be another EPC in the vehicle or a dedicated processor. With continued reference to FIG. 1, the message is received over a wired connection conceptually represented by the input arrow 188 corresponding to the communication stack module 116. If the message is deemed a non-security-critical message by the communication stack module 116, the message may be passed to application software module 114 where the instructions in the message may be executed. If, by contrast, the message is deemed a high-privilege message and lacks a MAC, the communication stack module 116 may discard or ignore the message, or optionally send an error message to one or more devices in the vehicle network. Further, if the message is deemed high-privilege and includes a MAC, then the communication stack module 116 passes the message to the crypto service manager module 118. The crypto service manager module 118 forwards the message to the crypto interface driver 120 using the operative coupling indicated by line 189. In this embodiment, the host device 102 is seeking to verify the authenticity of the MAC to ensure the security-critical message is authorized. Accordingly, the MGAL enforcement module 122 is not needed in this case.

The crypto interface driver 120 thereupon transmits over hardware connection 106 a MAC verify message to the MAC verification module 103 of the security peripheral device 104. In various embodiments, the MAC verify message may include an ID corresponding to the MAC (e.g., SecOCDataID or the like) along with the MAC to be verified. In addition, the host device 102 may include within the MAC verify message a key serial number (KSN). In this embodiment, the host device 102 may instruct the security peripheral device 104 which key to use by including the KSN. At the security peripheral device 104, the MAC verification module 103 receives the MAC verify message. The MAC verification module 103 may be generated by code running on the security peripheral device, or it may be implemented in hardware, middleware, or a combination of hardware and software.

Based on the KSN as an index or the like, the MAC verification module 103 retrieves the corresponding key from the MAC verify keys module 105. Like the MAC generate key module 107, the MAC verify keys module may include a data repository of private keys used by the host device 102. The specific key identified may depend on the function of the security-critical message and in this case is specified by the KSN. The MAC verification module 103 retrieves the corresponding key using the KSN. The key is then used to determine whether the MAC sent for verification is in fact valid. It should be noted that the KSN is often initially determined during a service discovery phase. In that case, the KSN of the arriving security-critical message should match that of the KSN discovered by the host device 102. If no match exists, the arriving message is rejected as unauthorized. Thus, for example, during a service discovery period, the host device may participate in a service discovery procedure in which key serial numbers (KSNs) are stored in the non-volatile memory 723 of the host device (see FIG. 7). Each of the KSNs correspond to a server configured to offer, or a client subscribed to receive, a designated service. Subsequent to the service discovery procedure, any data received by the host device that corresponds to one of the designated services that is not accompanied by the corresponding KSN stored in the non-volatile memory during service discovery is rejected. The above discovery period may also apply on the server side, such that when a client (which may be another device in the vehicle) subscribes to a service and the host device is acting as a server for that service, the host device stores the KSN associated with the client. Thereafter, the server continues to ensure that any remote procedure call (RPC) received is accompanied by the same KSN stored during the service discovery period. If the KSN is different, the server rejects the RPC.

If the retrieved key is successfully used by the MAC verification module 103 to match the received MAC from the crypto interface driver 120, the security peripheral device 104 determines that the security-critical message is valid. The MAC verification module 103 of the security peripheral device 104 sends this result over hardware connection 108 back to the crypto interface driver 120 of the host device 102, authorizing the processing of the message. The result may then be forwarded along with the message across the chain of modules from module 120 to module 118, module 116, and application software module 114, where the instruction included in the subject security-critical message is executed and the action is performed.

In sum, if a database or other entity associated with the application software module 114 has a message to send to a designated receiving component, the message is passed to the communication stack module 116. If the message is a non-security-critical message, the message is then sent via the communication stack module 116 to the designated receiving component for execution on the receiving module using whatever network or hardware connections are in place. If the non-security-critical message specifies that it is intended for use in the application software module 114 of the host device 102, the communication stack module 116 simply passes the message back to the application software module 114 for execution. If the communication stack module 116 instead determines that the message from the application software module 114 is a security-critical message, the communication stack module 116 determines that the message requires a MAC. The message is then passed through the various modules 116, 118 and 120 using the lower set of horizontal arrows in FIG. 1. At the crypto interface driver 120, the MGAL enforcement module 122 is used to determine whether the MGAL policies permit the message to be given a MAC, as discussed above. If the message is authorized, a MAC generate message such as the one described above is then passed to the MAC generation module 109 of the security peripheral device 104 using hardware connection 110 (which may be one conductor or a plurality of conductors). The security peripheral device generates a MAC, which is returned over hardware connection 112 (which may include one or more conductors) back to the host device 102. The message is then passed from modules 120 and 118 to the communication stack module 116. With the MAC appended to the message, the message is then sent to the designated receiving device for execution.

Consequently, the exacting transmission procedures according to aspects of the disclosure make the principles of SOA with service discovery in networks feasible while preventing vehicle nodes, messages or services from being spoofed or otherwise sustaining deleterious consequences resulting from attacks while within an in-vehicle network. The KSN may also be used to verify the MAC for a received security-critical message. When the KSN is received as part of the message, the host device 102 may compare it to an expected KSN obtained during a service discovery procedure. If the received KSN does not match the expected KSN, the MGAL enforcement module 122 may determine that the received message is not authorized.

Aspects of the present disclosure are also directed to rendering security procedures more compact and efficient in entities like network nodes (e.g., electronic control units or ECUs) of a vehicle. The overall number of objects and instructions may be reduced within a node without reducing—and in some cases increasing—the effectiveness of the high security techniques within a node and between nodes. Because these software-equipped ECUs control functions including braking, acceleration, and the like, maintaining adequate security in these instances is paramount.

At the same time, while these ECU-based systems do much to increase efficiency, usability, occupant comfort, driver assistance, and lower costs, previous lines of vehicles dependent on ECU and/or node-based technologies were historically difficult to upgrade in a cost-effective manner. For one, vehicles have traditionally suffered from the lack of a viable software platform that abstracted hardware layers, which would make it otherwise easier for developers to write code that is compatible with specific vehicle types. Instead, many of the ECUs had software written down to very low layers including the physical layer. Equally, the lack of a tangible, uniform platform across applications in existing vehicles and transport mechanisms was a hindrance in itself to finding effective developments to spoofing or other malicious practices in vehicle networks. These challenges were present in part because the different vehicle brands relied on software at disparate levels and the industry lacked a standard platform for effectively developing widely berthed network software that operated in a recognized and predictable way.

In apparent recognition of at least some of these issues, the SOA for the automotive industry has recently become popular. To attend to demand and to facilitate the exchange of critical information, vehicles became a natural candidate for the technology. SOAs operate from a communications perspective on an "on demand" basis." For example, a sender of data may transmit information where it is known that at least one listener in the network needs the data. At the outset, this architecture avoids participating in the unnecessary jabber that occupied the vehicle's communications system.

The above advances are in contrast to previous approaches in which few or no limitations were placed on transmitting instructions. That is, the evolution of vehicles originally took a data intensive approach in which the vehicle's main sensors produced voluminous data, which in turn were regularly transmitted to different nodes in the vehicle. Sensor data was sent blindly between entities, for instance, regardless of whether the data had changed. Data was also sent from the viewpoint of the sending device. That is, provided the sender concluded the data was at least marginally relevant, it was sent, regardless of whether listeners were actually present on the vehicle's network.

By contrast, in more recently developed SOAs, a more pragmatic approach is adopted. The sender transmits data when at least one receiver currently on the network needs it. These limited communications obviated a lot of the redundant transmissions that just consumed bandwidth and increased latencies of even high-priority messages. A further evolutionary advance in some implementations is that SOA may rely on the presence of middleware. With known middleware in circulation and used in and across SOAs, developers may concentrate on scalable architectures to design SOA software for vehicles, such that the complexity and number of instructions may be proportionate to the size and functional sophistication level of the vehicle. Scalable service-oriented middleware over IP is responsible for the acronym SOME/IP. Another popular open source middleware is AUTomotive Open System ARchitecture (AUTOSAR), which includes a consortium of worldwide automobile manufacturers as members. To date, AUTOSAR has promulgated solutions that offer increased flexibility using more tailored and uniform standards.

To maximize this flexibility, third-party applications may be installed in the vehicle and used in conjunction with various ECUs. It is important to ensure that such applications are not able to thwart existing security protocols and spoof, for example, the node(s) required for braking, displaying vehicle-critical numbers like speed, revolutions per minute, and the like, or other significant tasks, e.g., in order to prevent an unwanted braking action by the driver. These are but a few of many examples of why security across these network nodes is important. As noted, ECUs may range from controlling the engine to the airbags to the brakes, and many other systems. An ECU may often receive inputs including information about whether to perform a certain task, and after performing some relevant computations using the input, the ECU may output data intended for an actuator to allow the actuator to perform another related action based on a defined set of parameters.

Concerning security, the techniques according to the disclosure subject such security-critical messages to be authorized by the MGAL enforcement module before being sent to the security peripheral device 104 to obtain a MAC are designed to address these same problems to which the SOA in a vehicle is otherwise susceptible. By the same token, for messages with a MAC that arrive at a receiving node for execution, the aspects disclosed herein rely on a security peripheral device that is able to retrieve the proper corresponding key to successfully match the key that originally generated the MAC to thereby provide the receiving node authorization to execute the corresponding message.

Existing solutions are relegated to assigning each V-ECU its own transmit key to prevent spoofing when generating messages, where spoofing in this context includes imitating another entity to convince the recipient of the message that the V-ECU is permitted to transmit the subject message. The subject message is effectively attempting to perform unauthorized action that may be hazardous to the driver if left allowed. In the case of an ECU, the number of entities, or V-ECUs, within a single ECU is increasing in many vehicle designs.

The same logic may be applied to an architecture with a plurality of V-ECUs in a single ECU. Existing designs may also include some type of "crypto-engine" built into an example four V-ECU network host. The crypto engine or MGAL enforcement module may be populated with information or otherwise appropriately configured via hardware such that the crypto-engine knows which V-ECU is making the request of the four ECUs, since the crypto engine knows the key for each V-ECU. The idea is that, if V-ECU 2 is trying to make a request to generate a message authentication code ("MAC") for a message using the key belonging to the V-ECU 3, rather than its own key, then the Crypto Engine will know in advance that the wrong key is being used by V-ECU-2. As such, the Crypto Engine is not going to let the V-ECU 2 generate the MAC to perform the instruction it is not otherwise permitted to form. The request is therefore denied.

Until recently, in-vehicle networks used a static configuration in which there was little or no need to activate mobile sensors or nodes. As such, in those cases it is easy to know what nodes will need to send or receive which messages. In this static configuration, most exchanges of data were known in advance, except for system updates. Even in the latter situation, however, the updates were typically directed at both the transmit and receive circuits.

The concept of service-oriented architecture may include publishers of information and subscribers. The vehicle user or occupant may elect to subscribe to some service, but the provider of the information and the publisher may move around over time. This means that in some cases, the vehicle's owner or the driver may need to wait until a new provider is available. Accordingly, with this background, the concept of the service-oriented architecture may provide the need to move devices around and thus provides the vehicles with the discretion to make spoofing and other negative measures difficult for ECUs or other controlling devices.

With the longstanding concept of static vehicle architectures, internal security was not as much of a primary concern, since critical paths within the vehicle were well-known and dedicated hardware was configured to repeatedly perform particular tasks including moving, shifting, navigating, accelerating, braking and the like. However, the concept of SOAs has changed the manufacturing landscape and with these changes, security measures have to adhere to the demands of the increased sophistication and capabilities of newer vehicles. For instance, the vehicle user or occupant may elect to subscribe to one or more of the many services being offered, meaning that the location of the information-providing structure(s) in the vehicle and the physical position of the ECU or node giving and receiving instructions may be dynamic and may change in real time. Dedicated connections may be few and far between. Accordingly, with the possibility of such changes, the concept of the SOA may give rise to a need to move data and instructions around and thus may provide the vehicles' electronics with the discretion to do so.

In this system where entities (including plug-in devices, for example (or the location of applications and functions on different processors in the vehicle), move around a lot and they become more dynamic rather than static, as is an increasing trend, it may behoove the entities to place less emphasis on the identity of the suppliers, which may also change with time as a function of movement of these entities within the vehicle. Where the entities in fact become dynamic, the service providers may not attempt to follow the random pattern of ECU movement, especially as this trend continues to increase with vehicles. Accordingly, in the aspects of the disclosure demonstrated in FIG. 1 and ensuing figures, spoofing by other nodes may be prevented by using the security peripheral device 104 in conjunction with the MGAL enforcement module 122 in the crypto interface driver 120 of the host device 102 to restrict what message types this host device 102 and other nodes in the network may have a legitimate MAC generated for them. This information is potentially vital to the reliable operation of the vehicle.

In addition, host device 102 may include software components such as the communications stack-namely, the software for communicating with other nodes. The host in FIG. 1 is shown coupled to a security peripheral device 104. Security peripheral device 104 may include a MAC verification module 103, and a MAC generation module 109. The MAC verification module 109 has access to the corresponding MAC verify keys module 105 while the MAC generation module 109 has access to the MAC generate key module 107. The MAC verify and generate keys are securely stored, and in some embodiments are stored with the MAC verification module 103 and/or the MAC generation module 109. Security peripheral device 104 may include executable code for performing security-critical functions, generating security messages, managing keys, and the like.

In short, the problem of nodes (e.g., ECUs) being susceptible to spoofing when gaining the flexibility accorded SOA in a network (e.g., an in-vehicle network) is mitigated, if not solved, by requiring the transmitting node of a security-critical message to generate a message authentication code (MAC) over the message to be sent using a security peripheral device 104 or crypto accelerator module. The security peripheral device 104 or another module with access to the security peripheral device 104 or crypto accelerator will check an authenticated policy in the MGAL enforcement module 122 to determine if the message is allowed to be transmitted by the node. The receiving nod(s) (e.g., another node or ECU located at a different portion of the vehicle, whether or not nearby, rejects the message if it does not have a valid MAC.

In some embodiments, the MGAL of the MGAL enforcement module 122 indicates whether the device attempting to send the message (e.g., host 102) (1) is permitted to be a client that sets or changes a target value, (2) is permitted to be a client that reads values, or (3) is instead a server that publishes values and offers subscriptions. Thus, for example, in a scenario involving (1) and (2) in this paragraph, the device is the client, and it is the client that is policing itself (via the MGAL enforcement module) to prevent itself from performing an action that it is not authorized to perform. The device is not the server in (1) or (2), which in this example is the receiving device of the message.

FIG. 2 is a conceptual diagram of an example ECU 200 including a host device 102 having two processor cores 224 and 226, wherein the first processor core is configured to execute the application software module 114, the communication stack module 116, and the crypto service manager module 118, and wherein the second processor core is configured to execute the crypto interface driver 120 (and the MGAL enforcement module 122 therewithin). The ECU 200 in FIG. 2 also has a separate security peripheral device 104a (which may, as in FIG. 1, include a crypto accelerator), and components otherwise identical to that of FIG. 1. In various embodiments, the processor may include a plurality of cores such that different functions are devoted to each core. The exemplary analysis of FIG. 2 is for simplicity and shows that the processor has two cores.

The node of FIG. 2 is functionally equivalent to that of FIG. 1, the major difference being that modules 114, 116, and 118 are executed on one physical core 224 while crypto interface driver 120 executes on another physical core 226. Isolating the non-security-critical modules and security-critical modules on separate cores has benefits. Some settings may be assigned to the modules on one core versus the other. As an example, because the modules on physical core 224 have no ability to directly interact with the security peripheral device 104, the manufacturer may set the system up so that core 224 just accepts commands and messages to and from core 226. By so configuring the host, MGAL enforcement may be assured where a security-critical message is generated at the application software module 114 or received at the communication stack module 116. Core 226 may then be dedicated in this example to security-critical security enforcement.

FIG. 3 is an example diagram of a data packet 204.4 for use transferring information between ECUs or other nodes in accordance with an embodiment. The data packet (PDU) 204.4 is for example purposes, and different items of information may be transferred between nodes depending on the implementation and objectives. Generally, the horizontal direction of the figure represents time. FIG. 3 involves transmitting information shown symbolically using different texture maps to represent the different fields.

As noted, a trusted node in the vehicle network, e.g., in a new or different physical location, may still send a transmission, and the receiving node may still be able to authenticate the map using the MGAL enforcement module 122—for example, the transmitted MAC may include a key serial number (KSN) 210 in its message (also highlighted as field 212). KSNs 210 may be linked to keys stored in the security peripheral of the receive nodes to enable the receive nodes to know which keys to use to authenticate the received MACs. The KSN 210 may also be linked to the particular transmit node and will change if the nodes are moved to a new location in which a new key is required.

The Secured PDU Header 206 (both SD and non-SD) includes header information relevant to the type of SD request (if applicable) as well as the KSN 210 embedded in the PDU 204.4 which provides, as noted, a link to the transmit key to use, which in turn implicitly identifies the node from where the message was transmitted. Following the secured PDU header 208 is a is a SOME/IP serialized payload 208, followed by the KSN 210, followed still by a freshness value (("FV") value) describing the relative freshness of the data 214 (e.g., relative to time or relative to recency of other similar data). The FV 214 is finally followed by the MAC 216.

The above PDU 204.4 is one of many possible examples, and numerous PDUs may be used depending on the objectives and goals of the architecture. As noted, certain aspects of the disclosure entail transmitting a key serial number (KSN) 210. Data is communicated within the vehicle over the middleware (via the application software module) over a physical network cable (conceptually represented by arrows 188 of FIG. 1 running over the network hardware) between the server ECU and a client ECU using the TCP protocol (if data is requested from the server) or UDP protocol (if data is requested from the client). In this example, the PDU 204.4 represents a service-discovery ("SD") message that includes a SOME/IP serialized payload 206. The acronym of SOME/IP refers to "Scalable service-Oriented MiddlewarE over IP". As discussed herein, today's vehicles are more feature-packed than other vehicles adopting non-SOA Architectures. Reliance for SOA vehicles using ECU-to-ECU protocols such as CAN and MOST is limited, given the low bandwidths and lack of interoperability of the latter protocols and the vehicles in which they would be used, making the latter primarily suitable for lower-functionality vehicles with static and dedicated connections. By contrast the SOME/IP serialized payload 206 may be operable across a number of different units of an ECU. The IP refers to the fact that SOME/IP is an Ethernet-based protocol.

As noted above, the receiving nodes of a message need not be focused on the specific identity of the entities sending them messages, provided they are trusted nodes. This makes the overall process of moving nodes much easier. At the same time, the sending nodes remain subject to the protections afforded them via the MGAL and security peripheral device 104 shown in FIG. 1. The system may ensure that a node cannot send messages or data it is not authorized to send based on the contents of the MGAL policy module or the security peripheral device. From the receive side, the service may be moved without having to rename the moved nodes or reconfigure the policies, since in the above examples, the trustworthiness of the senders is based on whether their requested MAC ID or service ID was present on the MGAL list. Thus, the nodes may be moved to a new location without losing their effectiveness.

FIG. 4 is a timing diagram illustrating the distinction between the "get" and "set" permissions accorded nodes in a vehicle, according to an embodiment. The functions in FIG. 4 may be implemented by a combination or hardware and software. For example, the "get" and "set" schemes (below) may be governed by the processor along with the crypto interface driver 120 and the security peripheral device 104, The get/set scheme illustrated by FIG. 4 provides assurance that, when multiple nodes/ECUs within a vehicle are performing a function or implementing a feature, such as acquiring the speed of the vehicle for the purpose of make calculations relevant to the air bag. The ECU network 400 is intended to be a miniature portion of the ECU network; however, the scheme is also intended to function on a much larger capacity. Just three devices on the network are shown to adequately convey the principles of this powerful embodiment.

For the purpose of this example, it is assumed that the client of device A 402 is a node that has been maliciously taken over, at least in part, by an intruder. Device A 402 may, for example, constitute an infotainment system of the vehicle. It is assumed that the intruder has plugged in a black box to a port on the entertainment system in an attempt to modify the vehicle speed to a very high or very low value. Meanwhile, the client corresponding to Device B 404 may be an ECU with control over the accelerator, whereas the client at device C 406 may be an electronic device that controls the fuel injection system or battery-operated power to directly accelerate the motor on the device under the right circumstances. In an aspect of the disclosure relative to the above example, whether a given client is entitled just to "get" a value (e.g., read the vehicle speed and/or pass it along) versus whether the client is also entitled to "set" the value (e.g., depress the accelerator and increase the speed of the vehicle) may be controlled by the permissions applied in the MGAL enforcement module 122 of FIG. 1

Referring to FIG. 4, the black box plugged into the infotainment system (Device A—402) may send an instruction to Device B 404, the latter of which may be used to adjust the accelerator. Device B 404 may take the instructions from Device A 402 (via path 408). Device A 402 may then receive the data, e.g., via path 412, after which Device A 402 may transfer the data to a recipient device using path 410. Based on MAC 218 or a KSN or other ID present in the message, Device B may easily determine that client A 402 lacks authority to "set" a value—for example, to set (and effectively change) the vehicle's speed. In this case, it is assumed that while Device A has a "set" privilege to display the vehicle speed on the infotainment system and to estimate miles per gallon, but the MGAL enforcement module 122 knows to prohibit Device A 402 from setting or changing the speed, and the intruder's malicious attempts are thwarted. Client 5 404 may deny the request to adjust the speed, as indicated by the bold circle with the slash through it under Device B 404.

By the same token, the client at Device B 404 may be recognized as the foot of the driver depressing the gas pedal. This action may instigate a request to set a new speed at Device B 406 to Device C 406, sent over path 416. Thus, the request to increase the speed of the device may flow to Client C 406. Client C and Device C 406, after optionally acknowledging the validity of the request in a message sent from device C 406 back to Device B (404) using path 414, may use the KSN or other ID to determine whether the MA 218 appended to Device B's message matches the MAC appended to the message from Device B 404. Finally, the infotainment system (Device A—402) may send a request to Device B to "get" the speed for use in mapping and traffic. Device A, upon recognizing that the MGAL enforcement policy of Device B for "gets" are valid, may proceed to provide to Device A—402 the requested information. Thus, while Device A lacks the privilege to adjust the speed, Device B is still permitted to display the current speed to Device A.

The above is but one embodiment of the "get" and "set" actions that are authorized or forbidden by the relevant MGAL enforcement policy. One advantage of this approach is that critical actions may be accomplished with low latencies. Another advantage of this approach is that it may accommodate changes to the devices. The source of the device is not necessarily important, provided that the MGAL enforcement policy matches.

In short, using the principles of the disclosure enables the network elements to be moved to a different physical location without compromising the effectiveness of the network to prevent against spoofing attacks and other malicious forms of hacking by maintaining the information in the transmit modules. Thus, a vehicle operator or other individual may enjoy the services offered by the same network in a different geographic location, such that just the transmit node needs to be updated. The information in the dozens or hundreds of receive nodes may be left alone and the operator may still offer and exchange the usual services merely by adding information to a few new transmit nodes, and without loading data into the many receiving devices in the vehicle.

(1) Shared secret keys are established in nodes (e.g., ECUs) and stored in the security peripheral of nodes in such a way that each node has a dedicated key used for transmission and the receiving nodes store the same key to authenticate messages from transmitting nodes in their security peripheral in a way that prohibits the key from being used to generate MACs. When the transmitting node needs to send a protected message with a MAC it requests the security peripheral to generate the MAC and the security peripheral will use the MGAL to check if the message is allowed to be sent by the node. If the MGAL indicates the message is not permitted to be sent the security peripheral does not provide the MAC. (2) The security peripheral will use an MGAL based on bit masks to choose which nodes the entry applies to for non-service discovery messages. (3) The table used to build the MGAL configuration for each node will be based on security peripheral key serial number and key use flags and be organized in a way that enables an entry to be directly accessed with a pointer, rather than using a lower performance search algorithm (4) The security peripheral will use the config option field at the beginning of the options section in the service discovery (SD) header to determine if SD messages should be allowed to be sent based on the entries in the MGAL. (5) If multiple cores are used and have different access rights, the MGAL is structured in sections for each core as a sorted list of pairs to make it easier to process. (6) When the protected message is transmitted by a node it will include a key serial number (KSN) in SOME/IP packets to convey Key IDs while minimizing the change required in the communication stack module 116 to process new packets (7) SOA Message IDs are decoupled from security peripheral Key serial IDs to allow for dynamic discovery of services and use of correct key material at runtime (8) If a transmitting node needs to be able to offer a new service the MGAL is updated via signed calibration or firmware update that is authenticated by the security peripheral before use The crypto accelerator portion of the security peripheral device 104 may be included to perform operations that need very low latencies (e.g., securing messages sent between in-vehicle devices). Some microcontrollers may have a dedicated crypto accelerator in addition to a separate security peripheral device to perform these low-latency operations. These separate crypto accelerators tend to have significantly better performance than the separate security peripheral device, at least because they are hardware-based and not executing software. However, because the crypto accelerators do not execute software, MGAL enforcement software cannot be placed within them. Accordingly, in another aspect of the disclosure, a vehicle may obtain the performance benefit of using the crypto accelerator instead of the security peripheral for such low-latency requests by including the MGAL enforcement module in an entity in the host device and restrict access to the crypto accelerator to that entity.

The principles of the disclosure are equally applicable to newly installed programs using, where authorized, secret keys to generate MACs, and public keys to verify that the generate MACs are authentic. Thus, the nodes in the network maintain their trusted status even when relocated, with minimal software intervention directed at one or a few nodes.

Figure 5:
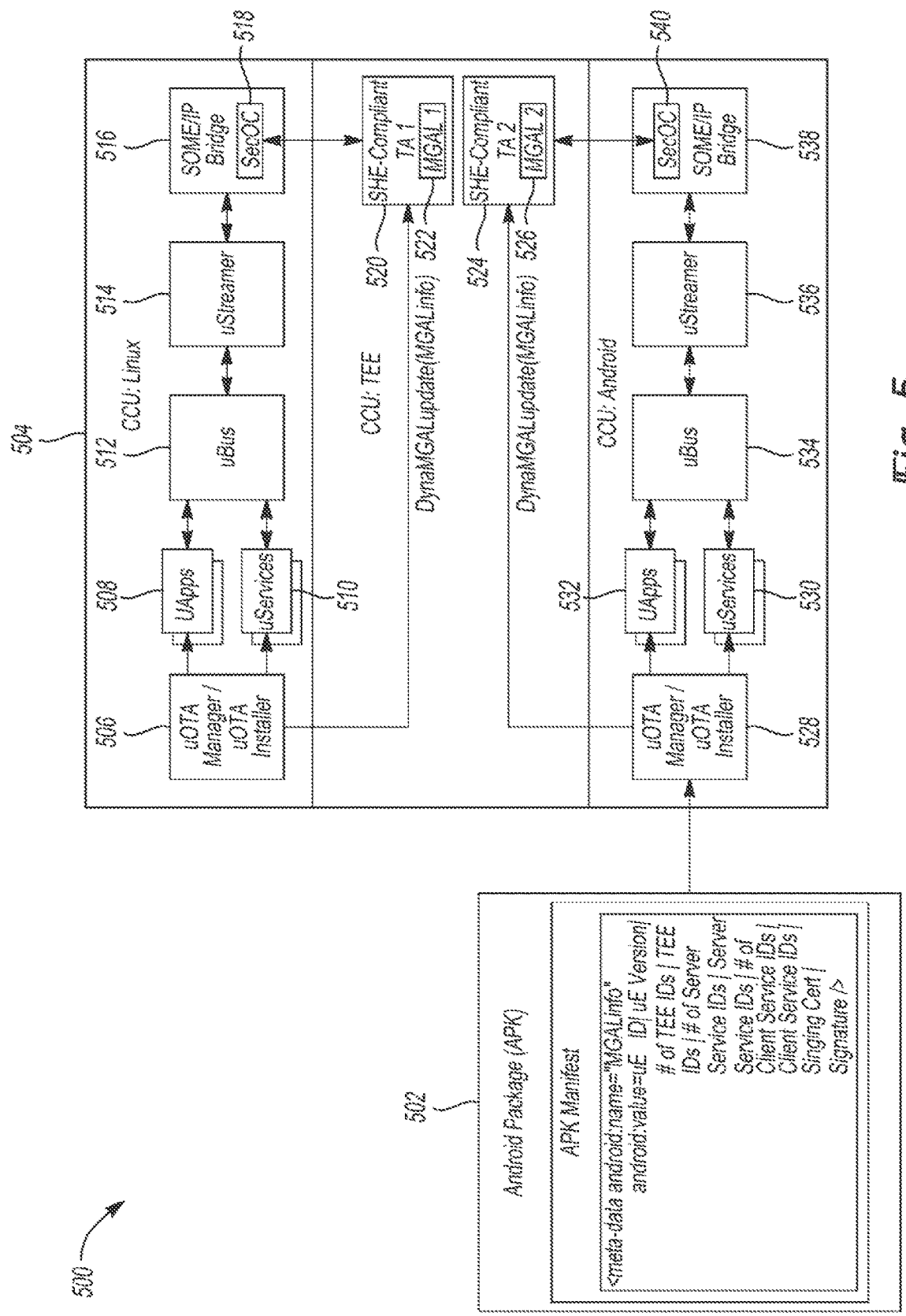
FIG. 5 shows a representation of a download of an Android Application Package (APK) onto an Android virtual machine of a dual virtual machine processor for handling firmware updates, according to an embodiment.

FIG. 5 shows a representation 500 of a download of an Android APK onto an Android virtual machine of a dual virtual machine for handling firmware updates, according to an embodiment. That is, FIG. 5 illustrates an Android virtual machine running along with a Linux virtual machine. The two virtual machines are running as a collection 504 atop a hypervisor, the latter of which is a type of hardware that runs on the physical layer of a host machine. This enables the multiple virtual machines to run as a guest machine on a single host machine. The hypervisor provides the virtual machines with a virtual operating platform and manages the systems, typically using the native hardware. The "u" prefix that precedes several of the logic blocks in the virtual machines merely specifies a name of a common technology and may be ignored for the purpose of this Figure.

When a vehicle is initially manufactured, it is straightforward to establish initial settings and implement the desired MGAL policy. Newer vehicles may have "app stores" where the driver will download applications and services from the app store. For example, the OTA manager and installer 527 may download and install an android application 502 in the form of an android package from the internet. Depending on the nature of the application or service, the application 532 or service 530 may be forwarded across the Android bus 534, where it may be partitioned and streamed (e.g., using SOME/IP) using bridge 538. Both virtual machines may cache the SecOC ID value at 518 and 540 for identifying the MAC.

When the update is accomplished, it is important to ensure that the MGAL (here, the SHE-Compliant TA2 524 and MGAL2 module 526) is also updated dynamically. FIG. 5 is a conceptual description showing the need to have MGAL permission to update the MGAL to enable the application to perform authorized functions. Thus, when the android application is downloaded from an app store, it may be accompanied by a manifest, into which the virtual machine may add metadata. This data may include, such as here, the name and value of the MGAL, as well as the ID and number of various functions it may perform as a server of the client services it may perform. The objective at this point is that the android application will have the MGAL information needed such that whatever trusted application is enforcing the MGAL, it may obtain the information from a designated back office where the private key authorizing the MGAL update is kept.

Stated differently, the android application will have the needed information such that whatever trusted application is performing enforcement of the MGAL the trusted application would get the relevant information and a signature generated by the vehicle's back office. The back office has a private key for the update such that it has access to sign and hence authorizes the actions. With reference to FIG. 5, if a user attempts to make their own malicious application and install it on the vehicle with a variety of permissions, they cannot corrupt the system in this manner because they're not permitted to sign the private key. The key is secured in a hardware security module and cannot be signed without authorization. Each virtual unit may include a respective MGAL unit, such as SHE-Compliant TA 1 520 that stores MGAL 1 module 522 for use in the Linux virtual machine, and SHE-Compliant TA2 624 that stores MGAL 2 module 626 for use in the Android virtual machine.

The entity enforcing the MGAL has the public key that's associated with the signing key. The public key may therefore be used to verify (but not create) the updated applications' signature. That way the system knows whether the permissions requested are actually authorized by the back office. It is through this vehicle that it may be verified that the entity enforcing the MGAL has the public key for verifying the signature. Signatures that do not check out are known to be malicious attempts to spoof the trusted back office.

The term "TEE IDs" in the android update 502 stands for "trusted execution IDs." Multiple trusted IDs may be used at once. When the android update 502 enters the OTA manager/installer 528, the installer 528 may transmit the MGAL information to the MGAL2 using the DynaMGALupdate (MGALinfo) data. The trusted execution IDs may be verified at the MGAL 2 using the public key, for example. Similarly, an update (not shown) may be provided to the Linux virtual machine and received at OTA Manager/Installer 506. The data may be forwarded as applicable via Application module 508 or service module 510, via bus 512 and streamer 514, and then packetized using the Some/IP protocol referenced above. Meanwhile the OTA Manager/Installer 506 may provide the MGAL information corresponding to the relevant metadata, which may be checked at MGAL1 at SHE-Compliant TA 1 520.

Multiple trusted applications may be executed simultaneously. The Linux virtual machine may be running each with their own MGAL because on the Android platform, for example, infotainment-type actions may be running and therefore a need exists to have separate permissions since the Linux environment may be able to send out certain messages disallowed by Android.

It should be noted that, because Linux and Android are running on top of a hypervisor, which is in turn executing on the hardware, memory access may entail an extra step. For example, if the Linux application needs to access memory. Linux first goes through the hypervisor. The Linux and Android machines are running on top of a hypervisor, which in turn is running on the hardware. So, if the Linux virtual machine wants to access memory, Linux first goes through the hypervisor which controls what resources the Linux machine may access. The hypervisor is the layer that makes sure the two virtual machines who's together.

The APK flows through the virtual machine and at the end (MGAL), the MGAL ensures that the data is authentic. For example, the SHE-compliant TA 1 may check the signature to ensure the update goes through. CCU stands for Cycle-Compute Unit.

Figure 6:
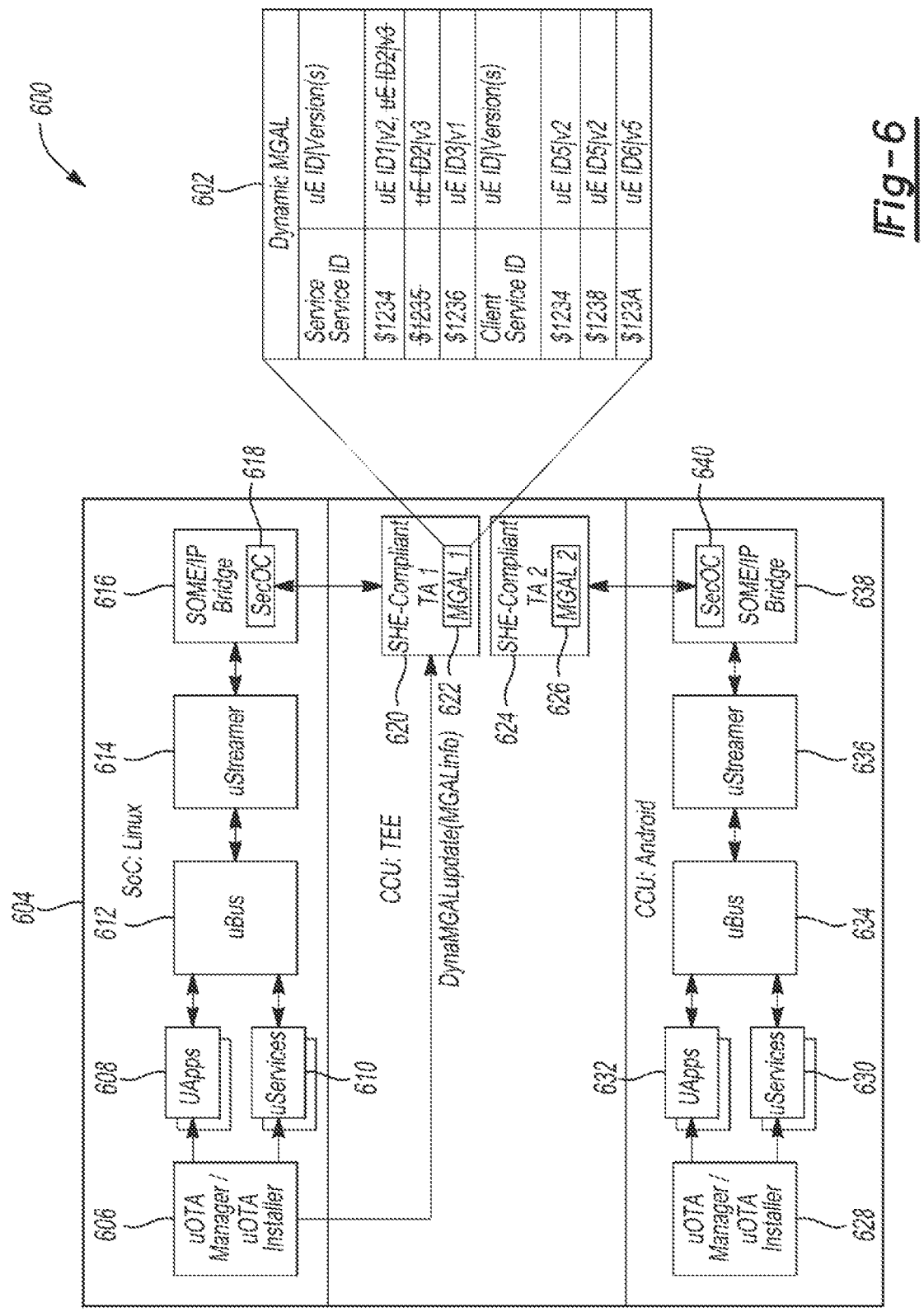
FIG. 6 shows a representation of a Dynamic MGAL Update using relevant information with two virtual machines on a computer, according to an embodiment.

FIG. 6 shows a representation of a DynaMGAL Update Module 600 using relevant information with two virtual machines on a computer, according to an embodiment. Like the embodiment of FIG. 5, FIG. 6 includes a collection 604 (here, two) of virtual machines: Linux and Android. In this embodiment, Linux is executed on a system on a chip (SoC) in the ECU. Unlike that of FIG. 5, FIG. 6 shows a slightly more difficult security task of uninstalling a program while ensuring the resources of the program are not compromised by malicious actions. The Linux virtual path includes an over-the-air (OTA) Manager/Installer 606, Apps module 608 (for processing applications), Services module 610 (for processing services), bus 612 for coupling the apps and services to the Streamer 614, and encapsulation unit 616 (e.g., for partitioning data into data units). The encapsulation units 516 may both have access to the SecOC 518 and 520 for verifying the MAC. The Android virtual path includes OTA Manager/Installer 628, application module 632 (for processing applications), Services module 630 (for processing services), bus 634 for coupling the apps and services to the Streamer 636, and encapsulation unit 638 including SecOC 640. Each virtual unit may include a respective MGAL unit, such as SHE-Compliant TA 1 620 that stores MGAL 1 module 622 for use in the Linux virtual machine, and SHE-Compliant TA2 624 that stores MGAL 2 module 626 for use in the Android virtual machine.

Maintaining security and functionality while dynamically uninstalling programs means that the Dynamic MGAL 602 should include not just each of the versions and identifications of the software, but also the metadata, including service, service ID, client and client ID. Uninstalling a program entails keeping track of which pass had permissions to access which service ID. The entity performing the MGAL enforcement keeps track of which service permissions are associated with which applications to be able to prevent removing needed permissions that an authorized application may be using. If the MGAL doesn't track service permissions for different programs/versions, then when a version is uninstalled, it becomes unclear whether the other permissions associated with that version should or should not be removed.

Accordingly, in an aspect of the disclosure, the dynamic MGAL 602 is perused when an installation occurs. For example, if uE ID2/v3 is removed, then service ID $1234 is retained because uE ID2/v2 remains installed and also uses that service ID. By contrast, if uE ID2/v3 is uninstalled, then $1235 may be deleted because no other active application is using that Service/Service ID. The result is a streamlined list of applications where just the metadata that is needed remains.

With reference to FIGS. 5 and 6, shared secret keys are established in nodes (e.g., ECUs) and stored in the security peripheral of nodes in such a way that each node has a dedicated key used for transmission and the receiving nodes store the same key to authenticate messages from transmitting nodes in their security peripheral in a way that prohibits the key from being used to generate MACs. When the transmitting node needs to send a protected message with a MAC it requests the security peripheral to generate the MAC and the security peripheral will use the MGAL to check if the message is allowed to be sent by the node. If the MGAL indicates the message is not permitted to be sent the security peripheral does not provide the MAC. The security peripheral may use an MGAL based on bit masks to choose which nodes the entry applies to for non-service discovery messages.

The table used to build the MGAL configuration for each node may be based on security peripheral key serial number and key use flags and be organized in a way that enables an entry to be directly accessed with a pointer, rather than using a lower performance search algorithm. The security peripheral may use the config option field at the beginning of the options section in the service discovery (SD) header to determine if SD messages should be allowed to be sent based on the entries in the MGAL.

If multiple cores are used and have different access rights, the MGAL is structured in sections for each core as a sorted list of pairs to make it easier to process. When the protected message is transmitted by a node it will include a key serial number (KSN) in SOME/IP packets to convey Key IDs while minimizing the change required in the communication stack module 116 to process new packets. SOA Message IDs are decoupled from security peripheral Key serial IDs to allow for dynamic discovery of services and use of correct key material at runtime. If a transmitting node needs to be able to offer a new service, the MGAL is updated via signed calibration or firmware update that is authenticated by the security peripheral before use.

FIG. 7 is a hardware representation of a node 700 in an aspect of the present disclosure, to which the principles of the present disclosure may be practiced. FIG. 7 may be a transmitting node such as an ECU, or a receiving node. FIG. 7 includes a host device 702. In some embodiments, such as in a security peripheral 704, not each element of the structure shown in FIG. 7 is needed. Node 700 may include a processor 721, which in practice may include one or more processors, general purpose processors, RISC (reduced instruction set computer) processors, digital signal processors (DSP), or a processing device that may implement functions and/or instructions purely in software, partially in software, or in a mix of hardware and software. Processor is coupled to memory 723, which may be dynamic random access memory (DRAM), static random access memory (SRAM); a non-volatile memory (such as for storing KSNs during a service discovery period), a magnetic disc drive, a solid state drive, other non-volatile memory, cache memory, or some combination of different types of memory, including those above. Receiving nodes may also include one or more sensors 725 for making measurements in vehicles and reporting the results, for example. To this end, such receiving nodes may widely cover a variety of sensor types and may in some cases be used in ECUs and transmitting nodes.

Node 700 may also include a transceiver 728 for sending and receiving messages to other nodes in the network through a compatible vehicle wireless medium. As noted, some ECUs have keys for generating or verifying MACs. To avoid unduly obscuring the scope of the disclosure, both are shown here as examples. A security peripheral 733 for MAC generation and an accompanying MGAL may be found within or coupled to host nodes as part of an ECU. Separately element 735 is a module for MAC verification. In some configurations, including security peripherals, both modules 735 and 733 may be found in a single security peripheral. In other configurations, they are partitioned into different elements. The MAC generation peripheral 733 may also include a MAC engine 731 for executing low level commands.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented herein.

What is claimed is:

1. A system for authorizing messages in a service-oriented vehicle architecture, comprising:
 a security peripheral device; and
 a host device coupled to the security peripheral device and comprising a processor configured to execute code in a local memory thereto to produce a crypto interface driver, the crypto interface driver configured to determine whether the host device is authorized to send a security-critical first message from the host device to a receiving device by maintaining a message authentication code (MAC) generate allow list (MGAL) enforcement module at the host device, the MGAL enforcement module for receiving a first identifier (ID) for determining whether the first message is authorized and for enabling the host device to provide to a MAC generation module executing on the security peripheral device a MAC generate message including the first identifier (ID) when the first message is authorized, wherein
 the MAC generation module of the security peripheral device is further configured to retrieve a corresponding first key based on the first ID, to generate a first MAC based on the corresponding first key, and to send to the crypto interface driver of the host device the first MAC, and the host device is configured to send the first message together with the first MAC to the receiving device.

2. The system of claim 1, wherein when the first message is not authorized, the MAC generation module of the security peripheral device is unable to identify a key and refrains from generating a MAC.

3. The system of claim 1, wherein:
 when the host device receives a security-critical second message along with a second ID and a second MAC from a sending device, the crypto interface driver is configured to determine whether the sending device is authorized to send the second message to the host device by enabling the host device to send to a MAC verification module executing within the security peripheral device the second ID and the second MAC together with a key serial number (KSN) for identifying the key to be retrieved, wherein
 when the MAC verification module uses the KSN to retrieve a corresponding second key in the security peripheral device, the security peripheral device determines that the second message is authorized; and
 when the MAC verification module cannot identify a corresponding second key using the KSN, the security peripheral device determines that the second message is not authorized.

4. The system of claim 1, wherein the MGAL enforcement module comprises an authentication policy to determine if a message is allowed to be transmitted.

5. The system of claim 1, wherein the first ID includes a secure onboard communication data identifier (SecOC-DataID).

6. The system of claim 1, wherein the processor is configured such that the crypto interface driver has exclusive access to the security peripheral device for messages to be sent from the host device or received from a sending device.

7. The system of claim 1, wherein the processor is further configured to execute code to include:
   a crypto service manager module operatively coupled to the crypto interface driver for passing security-critical message types requiring MAC verification or MAC generation via the crypto interface driver to and from the security peripheral device;
   a communication stack module operatively coupled to the crypto service manager module for passing non-security-critical message types to and from other vehicle devices and for passing the security-critical message types via the crypto interface driver to and from the security peripheral device; and
   an application software module operatively coupled to the communication stack module for executing one or more software applications, the one or more software applications for performing one or more respective functions based on the non-security-critical message types and the security-critical message types passed from the communication stack module,
   wherein only the crypto interface driver is capable of interfacing with the security peripheral device.

8. The system of claim 7, wherein:
   the processor includes a plurality of processor cores,
   at least one processor core of the plurality is configured to execute code to include the one or more software applications, the communication stack module, and the crypto service manager module; and
   another processor core of the plurality is configured to execute code to include the crypto interface driver and the MGAL enforcement module therein.

9. The system of claim 1, wherein the first identifier (ID) along with the first message transmitted from the host device to the security peripheral device further includes a key serial number, the key serial number configured to identify a type of service associated with the first message and determined during an earlier service discovery period.

10. The system of claim 1, wherein:
    the host device further includes a non-volatile memory coupled to the local memory;
    the host device is further configured to participate in a service discovery procedure in which one or more key serial numbers (KSNs) are stored in the non-volatile memory, each of the one or more KSNs corresponding to a server configured to offer, or a client subscribed to receive, a designated service; and
    subsequent to the service discovery procedure, any data and any remote procedure calls received by the host device that corresponds to one of the designated services that are not accompanied by the corresponding KSN of the one or more KSNs stored in the non-volatile memory is rejected.

11. The system of claim 1, wherein:
    the MGAL enforcement module of the host device is configured to determine, based on the first ID, permissions of the host device, the permissions including:
    (1) whether the host device is authorized to act as a client that sets or changes a target value;
    (2) whether the host device is authorized to act as a client that reads the target value; and
    (3) whether the host device is authorized to act as a server that publishes values or offers subscriptions, and
    when the MGAL enforcement module determines that the host device is authorized to act as a client under (1) or (2), the host device uses the MGAL enforcement module to determine whether security-critical messages thereafter generated by the host device are authorized.

12. A system for authorizing messages in a service-oriented vehicle architecture, comprising:
    a plurality of nodes, each node comprising:
      a security peripheral device; and
      a host device coupled to the security peripheral device and comprising a processor configured to execute code in a local memory thereto to produce a crypto interface driver, the crypto interface driver configured to determine whether the host device is authorized to send a security-critical first message from the host device to a receiving node of the plurality of nodes by maintaining a message authentication code (MAC) generate allow list (MGAL) enforcement module at the host device, the MGAL enforcement module for enabling the host device to provide to a MAC generation module executing on the security peripheral device a MAC generate message including a first identifier (ID), wherein
    when the first message is authorized, the MAC generation module of the security peripheral device is configured to retrieve a corresponding first key based on the first ID, to generate a first MAC based on the corresponding first key, and to send to the crypto interface driver of the host device the first MAC, and the host device is configured to send the first message together with the first MAC to the one of the receiving nodes.

13. The system of claim 12, wherein when the first message is not authorized, the MAC generation module of the security peripheral device is unable to identify a key and refrains from generating a MAC.

14. The system of claim 12, wherein:
    when the host device receives a security-critical second message along with a second ID and a second MAC from a sending device within the plurality of nodes, the crypto interface driver is configured to determine whether the sending device is authorized to send the second message to the host device by enabling the host device to send to a MAC verification module executing within the security peripheral device the second ID and the second MAC together with a key serial number (KSN) for identifying a corresponding second key to be retrieved, wherein
    when the MAC verification module uses the KSN to retrieve the corresponding second key in the security peripheral device, the security peripheral determines that the second message is authorized; and
    when the MAC verification module cannot identify any key using the KSN, the security peripheral device determines that the second message is not authorized.

15. The system of claim 12, wherein the MGAL enforcement module comprises an authentication policy to determine if a message is allowed to be transmitted.

16. The system of claim 12, wherein the first ID includes a secure onboard communication data identifier (SecOC-DataID).

17. The system of claim 12, wherein:
    a host device comprises an Android virtual machine running on a hypervisor,
    the host device downloads an Android package,
    a private key authorizes that a manifest of the Android package be populated with desired fields, and the private key signs the manifest; and
    a public key corresponding to the private key verifies a signature.

18. The system of claim 12, wherein:
the MGAL enforcement module initiates an uninstall of a version of a Dynamic MGAL;
the MGAL enforcement module deletes service information, if any, corresponding to the uninstalled version of the Dynamic MGAL if the uninstalled version is the only application having the service information; and
the MGAL enforcement module preserves the service information, if any, corresponding to the uninstalled version of the Dynamic MGAL if the uninstalled version is not the only application having the service information.

19. The system of claim 12, wherein the host device comprises a plurality of virtual machines running across a hypervisor.

20. The system of claim 12, wherein the host device includes a security module for generating a verification key and a separate security module for generating a generation key, the generation key for creating the MAC consistent with a MGAL authentication policy.

* * * * *